Aug. 8, 1972   E. H. LAND   3,682,637
NOVEL PHOTOGRAPHIC PRODUCTS AND PROCESSES
Filed Aug. 21, 1970   4 Sheets-Sheet 1

INVENTOR.
EDWIN H. LAND
BY
Brown and Mikulka
ATTORNEYS

Aug. 8, 1972  E. H. LAND  3,682,637
NOVEL PHOTOGRAPHIC PRODUCTS AND PROCESSES
Filed Aug. 21, 1970  4 Sheets-Sheet 3
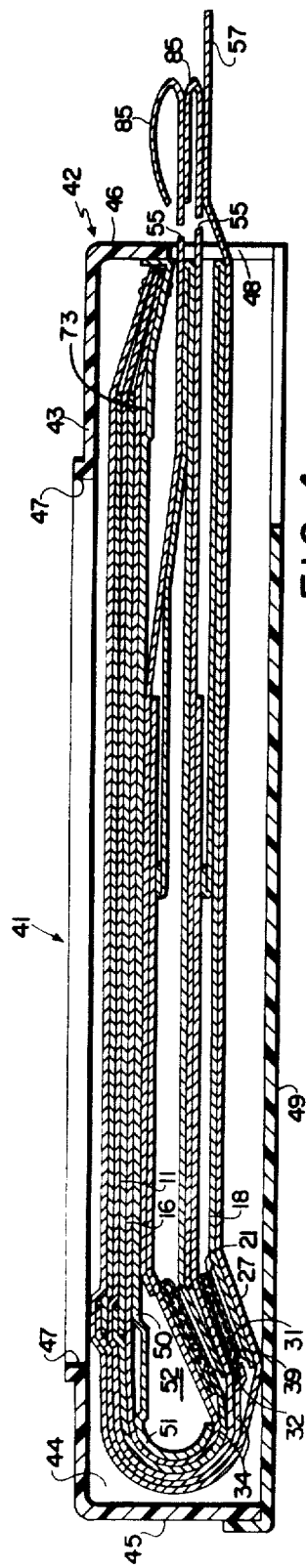
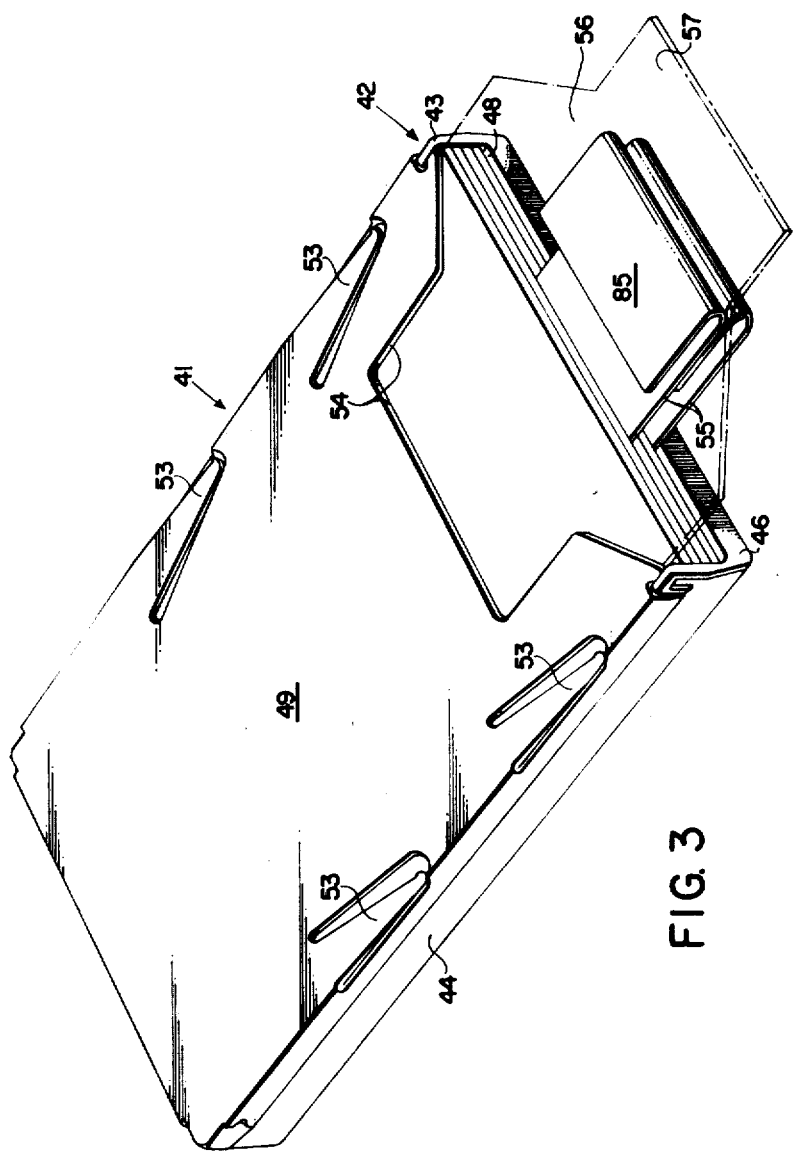
INVENTOR.
EDWIN H. LAND
BY
Brown and Mikulka
ATTORNEYS Aug. 8, 1972  E. H. LAND  3,682,637
NOVEL PHOTOGRAPHIC PRODUCTS AND PROCESSES
Filed Aug. 21, 1970  4 Sheets-Sheet 4

INVENTOR.
EDWIN H. LAND
BY
Brown and Mikulka

ATTORNEYS

United States Patent Office 3,682,637
Patented Aug. 8, 1972

3,682,637
NOVEL PHOTOGRAPHIC PRODUCTS AND PROCESSES
Edwin H. Land, Cambridge, Mass., assignor to Polaroid Corporation, Cambridge, Mass.
Filed Aug. 21, 1970, Ser. No. 65,815
Int. Cl. G03c 1/48
U.S. Cl. 96—76
12 Claims

ABSTRACT OF THE DISCLOSURE

Film assemblies in the nature of a self-developing film, for processing external to a camera in which the film assembly is exposed, and adapted to provide multicolor transparencies for projection, which comprise a photosensitive additive multicolor film unit including an additive multicolor optical filter screen having associated therewith photoresponsive and image-receptive materials adapted to provide a transfer image as a function of the exposure of the photoresponsive material; first and second opaque sheets adapted to enclose therebetween the additive multicolor film unit subsequent to exposure; at least one of the opaque sheets adapted to prevent exposure of successive film assemblies in a film pack containing a plurality of film assemblies for employment in such camera; container means retaining a fluid agent for reacting with the photoresponsive material to provide an image to the image-receptive material when distributed to the film unit; and means for coupling the sheets and withdrawing the sheets in superposed relationship enclosing the film unit from a film pack retained within such camera.

Subsequent to exposure in the camera, the film unit is withdrawn from the camera between pressure-applying members which effect release of the fluid agent for production of the transfer image. Subsequent to processing, the additive multicolor transparency is obtained by separation of the film unit from association with the opaque sheets acting to protect the unit during processing in the presence of radiation actinic to the photoresponsive material.

BACKGROUND OF THE INVENTION

The present invention is concerned with photographic film units, particularly adapted for employment in a photographic film pack or film magazine of the type shown in U.S. Pat. No. 3,080,805, issued Mar. 12, 1963, in the name of Joel A. Hamilton, comprising a container, at least one film unit mounted for exposure within the container and a closure element for preventing the admission of light into the container. As disclosed in that patent, each film unit includes, in combination, a first photosensitive element postioned for exposure within the container; a second nonphotosensitive element, preferably a print-receiving element, adapted to be superposed with the photosensitive element during withdrawal of the film unit from the container, following exposure thereof; and frangible container means particularly adapted to releasably retain a fluid processing composition for distribution between the superposed photosensitive and print-receiving elements subsequent to photoexposure of the film unit.

In general, the film pack or container includes an exposure aperture adapted to permit exposure of the photosensitive element; a removable closure element located across the exposure aperture; at least one film unit; and an opening permitting withdrawal of the closure element and film units from the container successively through this opening. The closure element and each film unit includes a leader adapted to project from the film pack through the opening whereby to provide means for selectively withdrawing the closure element, or a film unit, from the film pack into contact, and in engagement, with means adapted to provide individual distribution of the retained fluid processing composition, between superposed photosenstive and nonphotosensitive elements.

Film packs of this type are intended to be employed in photographic apparatus, such as a camera, which include means for maintaining a film pack in position for exposure, means for selectively exposing the photosensitive element of successive film units of the pack, and means for engaging each film unit during withdrawal from the pack, subsequent to photoexposure, and distributing the retained processing fluid between, and in contact with, the contiguous photosensitive and print-receiving elements of the film unit, for effecting photographic diffusion transfer processng of the respective, photoexposed film unit. Processing of each film unit may thus be effected manually by grasping a leader attached to the film unit and withdrawing the leader and film unit from both the pack and the camera.

In photographic diffusion transfer processing, the photosensitive sheet element is normally first exposed and then biased into superposed relationshp with a second sheet element, which is, in general, photographically inert and aids in the controlled distribution of the processing composition. The photosensitive element may contain an integral print-receiving stratum or the second sheet element may comprise a transfer image-receiving element. The contiguous sheet elements are moved relative to, and between, a pair of suitably opposed members such as gapped parallel pressure rollers or platens. Application of pressure to the frangible fluid-retaining means effects controlled rupture thereof and predetermined unidirectional distrbution of its processing composition contents between, and in contact with, the opposed surfaces of the superposed elements. Subsequent to transfer processing, the image-carrying area of the print-receiving element may be separated from the laminate.

In general, color photographic reproduction may be provided by exposing a photoresponsive material such as, for example, a photosensitive silver halide emulsion, to selected subject matter through an optical screen element possessing filter media or screen elements of selected radiation modulating characteristics such as filter media selectively transmitting predetermined portions of the electromagnetic radiation spectrum's visible segment. The color information thus recorded is read out by viewing resultant image conformation in the photoresponsive material through the same or a similar screen element in appropriate registration with the image. For the reproduction of subject matter in color and in accordance with the principles of additive color photography, the individual filter media or screen elements constituting the optical screen will be constructed to effect selective filtration of predetermined portions of the visible electromagnetic spectrum substantially corresponding to its red, blue and green regions and color information recordation is accomplished by point-to-point incidence of radiation actinic to the selected photoresponsive material as modulated by such screen element. Visual reproduction of the information content recorded by the photoresponsive material is accomplished by read out of the impressed image as modulated by the original or a substantially identical screen element in accurate registration with the image record.

Additve color photographic reproduction thus may be provided by exposing a photoresponsive material, preferably a photosensitive silver halide emulsion, though an additive color screen having a plurality of filter media or screen element sets each of an individual additive color such as red, blue or green, and by viewing the resultant photographic image, preferably a silver image, subsequent to development of such image, through the same or a substantially identical screen element suitably registered.

Although for color information recordation purposes, the photoresponsive material and optical screen may comprise separate and distinct elements appropriately registered during periods of exposure and viewing and the optical screen element may be temporarily or permanently positioned on the surface of a transparent carrier opposite that retaining the photoresponsive material, for practical purposes, it is preferred to permanently position the photoresponsive material in direct contiguous relationship to the color screen during exposure, in order to maximize the acuity of the resultant image record.

Subsequent to exposure of the photoresponsive material to actinic radiation transmitted through and filtered by the optical screen, the resultant photoexposed element may be further processed, where required, in accordance with the materials selected and generally without regard to the filter screen when the latter element is stable with respect to and/or protected from contact with the processing compositions and components selected. Such protection and stability will ordinarily be enhanced and facilitated by disposition of the filter screen between a transparent, processing composition impermeable carrier and the photoresponsive material, and, in particular, when such configuration additionally includes the presence of a processing composition barrier element or layer intermediate the screen and the photoresponsive material.

Subsequent to selective exposure of, for example, the preferred photoresponsive material, that is, photosensitive silverhalide, the resultant exposed material may be processed by diffusion transfer processing wherein the latent image provided to the photosensitive silver halide emulsion by exposure is developed and, substantially contemporaneous with such development, a soluble complex is obtained, for example, by reaction of a silver halide solvent with unexposed and undeveloped silver halide of the emulsion. The resultant soluble silver complex may be, at least in part, transported in the direction of a suitable print-receiving element, and the silver of the complex precipitated in such element to provide the requisite positive image formation. The resultant positive silver image, a silver transfer image, may be viewed through the same, or a similar, color screen element which is suitably registered with the positive silver transfer image carried by the print-receiving layer.

The preferred film units comprise a panchromatically sensitized photographic emulsion positioned contiguous a surface of a multicolor additive color screen which may possess the print-receiving element intermediate a photographic emulsion and the color screen, either with or without a stripping layer positioned intermediate the print-receiving layer and the emulsion layer, to facilitate separation of the emulsion layer subsequent to transfer image formation. Employment of the integral film unit allows exposure of the emulsion to be accomplished through a color screen, including through a transparent supporting member, if present, and formation of the requisite positive silver image in contiguous relationship to the color screen employed during exposure. Such embodiment accordingly obviates the necessity of registering the color screen with the resultant positive silver image, for viewing purposes, in that the screen employed for exposing may also be employed for viewing and is in automatic registration with the positive silver image.

Although, as disclosed in U.S. Pat. No. 2,614,926, the positive silver transfer image formation may be provided by an additive multicolor diffusion transfer reversal process which includes exposure of a silver halide emulsion layer through an additive color screen and separation of the emulsion layer, from contact with the remainder of the film unit, subsequent to processing, while retaining filter media and reception layer in fixed relationship, the process may also comprise those disclosed in U.S. Pats. Nos. 2,726,154 and 2,944,894, which are directed to a diffusion transfer reversal process which specifically includes exposure of an integral multilayer film assemblage through a screen possessing a plurality of minute optical elements and carrying photosensitive and image-receiving layers. As disclosed in the cited patents, transfer processing of the exposed film may be accomplished by permeation of the exposed integral film unit with a liquid processing composition and the image-receiving layer retained in permanent fixed relationship to the screen during, and subsequent to, formation of the requisite transfer image, with the operator's option of separating the photosensitive layer from the remainder of the film unit subsequent to transfer image formation.

Integral additive multicolor diffusion transfer film assemblages essentially comprising photoresponsive material directly providing positive image formation and possessing the sensitivity to incident magnetic radiation and acuity of image formation necessary to effectively provide color photographic image reproduction, are disclosed and claimed in the following copending applications which are directed in general to film unit assemblages which comprise a laminate which includes a support carrying on one surface of said support an additive color screen, photosensitive silver halide crystals and silver precipitating nuclei: Application Ser. Nos. 736,796, filed June 13, 1967; 889,656, filed Dec. 31, 1969; 889,657, filed Dec. 31, 1969; 889,660, filed Dec. 31, 1969; 889,636, filed Dec. 31, 1969; now U.S. Pats. Nos. 3,536,488 issued Oct. 27, 1970 and 3,615,427; 3,615,428; 3,615,429; and 3,615,426, all issued Oct. 26, 1971, respectively. The aforementioned applications are incorporated by reference herein in their entirety.

In the above-indicated film assemblages, the silver precipitating nuclei are present in a concentration effective to provide a silver image to the film unit possessing optical density inversely proportional to exposure of the photosensitive silver halide layer, and specifically, in a concentration adapted to provide a silver image derived from unexposed silver halide crystals possessing greater covering power than that of corresponding silver image derived from identical quantum of exposed silver halide crystals.

As set forth in the above-indicated applications, composite negative/positive silver image formation possessing an optical density inversely proportional to photoexposure of a photosensitive silver halide layer characterized by improved silver image minimum and maximum optical densities and image acuity may be achieved by a process which includes exposing a photographic film unit, which comprises a permanent laminate containing a support carrying on one surface silver precipitating nuclei and photosensitive silver halide, which elements may be disposed in whole or in part in the same or separate layers in the various spacial positions there disclosed, and processing the film unit by contact, simultaneous with, or subsequent to, exposure, with an aqueous processing composition, containing a silver halide developing agent and a silver halide solvent, to provide to the film unit the direct formation of a silver image possessing particularly desired low minimum silver image optical density, in terms of exposed areas of the film unit, and high maximum silver image optical density, in terms of unexposed areas of the film unit, as a function of exposure and transfer processing of the film unit.

SUMMARY OF THE INVENTION

The present invention is directed to a film assembly for producing color transparencies employing a film pack or magazine type unit. The assembly is composed of a photosensitive element comprising, in essence, an additive multicolor optical screen having associated therewith a photoresponsive material, such as photosensitive silver halide crystals, a layer adapted to receive the image formed as a function of photoexposure of the photoresponsive material and an opaque back sheet located distal to the screen element; a second opaque sheet adapted to be superposed over the exposure surface of the photosensitive element subsequent to exposure of the photoresponsive material; frangible fluid retaining means adapted to discharge processing composition retained therein between the opaque back sheet and the screen element; and means including a leader for coupling the photosensitive element and the second opaque sheet and withdrawing same in superposed relationship from the exposure apparatus.

The described film assembly is first exposed in an apparatus such as a hand-held camera by radiation incident on and selectively transmitted through the screen element and then biased into superposed relationship with the second opaque sheet to permit removal from the apparatus and processing of the exposed photoresponsive material under ambient light conditions external to the exposure device. Substantially contemporaneous with the removal of the film assembly from the camera, the frangible container is ruptured, discharging its contents of processing composition to the photosensitive element. Subsequent to processing, the color screen and associated image-carrying element is detached from association with the remainder of the assembly, thus providing an additive multicolor film transparency.

BRIEF DESCRIPTION OF THE DRAWINGS

FIG. 3 is a perspective view of a film pack comprising an assemblage of film units;

FIG. 4 is a longitudinal sectional view taken substantially midway between the sides of the film pack of FIG. 3;

DETAILED DESCRIPTION OF THE INVENTION

Figure 1:
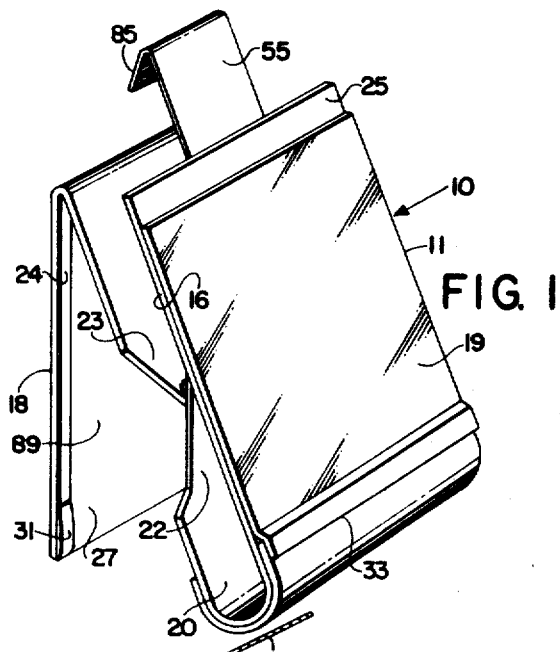
FIG. 1 is a fragmentary perspective view of a photographic film unit embodying the invention.

In accordance with the present invention, the preferred form of the film assemblage comprises a photosensitive film unit including an additive multicolor screen element having associated therewith a photoresponsive material adapted to be exposed by incident actinic radiation as transmitted through and modulated by the screen to produce photographic information recordation in accordance with the principles of additive color photography, an image-receiving element adapted to receive by diffusion transfer processing an image as a function of the exposure of the photoresponsive material, and an opaque sheet located contiguous the opposite surface of the layer containing the photoresponsive material from the screen; a second opaque sheet adapted to be biased into superposed relationship contiguous the exposure surface of the screen subseqeunt to exposure; a rupturable container containing a fluid agent for reacting with the exposed photoresponsive material for forming the image in the image-receptive layer; and means including a leader for coupling the photosensitive unit and the second opaque sheet and for withdrawing the unit and the sheet in superposition from a film pack or magazine.

Subsequent to image formation the screen element, including associated image-carrying layer, is separated from contact with the remainder of the film assemblage, including the first opaque sheet, to provide the multicolor projection transparency.

The preferred form of film pack or magazine embodying the designated film units comprises a plurality of the film assemblies, each adapted to be individually exposed in a camera, enclosed in a light-proof container which allows the film units to be sequentially exposed. The container includes a forward wall having an exposure aperture therein and an opening in one end through which film assemblies can be individually withdrawn with the photosensitive and second opaque sheet elements of each film unit in superposed relation. The photosensitive film units are positioned together within the container underlying the exposure aperture with the additive screen element uppermost and the second opaque sheets are arranged together, apart from, and behind the photosensitive elements adjacent the opening through which the film units are withdrawn so that following the exposure of the photosensitive element of each film unit, the photosensitive element is moved, by drawing on the leader of the film unit, into superposition with the second element of the film unit and the film unit is then withdrawn from the container through the opening. The film pack is initially provided with a cover element or sheet mounted within the container and extending across the exposure aperture for closing the aperture against the admission of light. The cover element also includes a leader extending from the container through the opening and being removable therethrough.

The film pack is employed by being positioned in a camera, including a pair of juxtaposed pressure-applying members, with the opening located adjacent the pressure-applying members and the exposure aperture disposed approximately in the exposure plane of the camera. The leaders of the film units and cover element extend from the pack and from the camera where the last-mentioned leader may be grasped for withtwrawing the cover element from the pack and camera to allow the photosensitive elements of the pack to be exposed. After the photosensitive elements of each successive film unit is exposed, that film unit is then withdrawn from the container and camera between the pressure applying members by withdrawing the leader of the first film unit and of successive film units from the container and camera.

By employing the film assemblages of the present invention, additive multicolor transparencies can be provided employing photographic diffusion transfer processing effected external the camera in which the film units were subjected to exposure and in the presence of ambient radiation.

DETAILED DESCRIPTION OF THE DRAWINGS

Reference is now made to FIGS. 1 through 5 of the drawings wherein there are illustrated film units and an assemblage of film units in the form of a film pack. Each film unit designated 10 comprises a generally rectangular photosensitive additive multicolor element 11, comprising an additive multicolor screen 12 carrying on one surface a silver diffusion transfer process image-receiving layer 13, a stripping layer 14 and a photosensitive silver halide layer 15; a first opaque sheet 16 secured to element 11 at the surface 17 opposite color screen 12, preferably laminated thereto, and a second opaque sheet 18 adapted to be superposed on exposure surface 19 of the element opposite the first opaque sheet 16. Both of these sheets are at least opaque to light actinic to the photosensitive silver halide material of layer 15 as to the respective sections of each sheet to be superposed coextensive a major surface of photosensitive element 11 to be protected from incident radiation. The aforementioned photographic recording media layer and transfer image-receiving layer are positioned intermediate the additive color screen 12 and opaque sheet 16 whereby exposure of the photographic recording media must be accomplished through and as modulated by screen 12. Opaque sheet 16 possesses a first leading section 20 approximately equal in width to element 11 and provides means for mounting rupturable container 21 of processing fluid, and includes a tapered leading end section 22. Second opaque sheet 18 is approximately equal in width to element 11 and includes a tapered leading end section 23 approximately equal in dimensions to tapered end section 22 of sheet 16. Side guides 24 are secured to the lateral edges of opaque sheet 18 coextensive the length of element 11 whereby to provide a gap control between sheet 16 and element 11 during processing, and the lateral boundaries of element 11 may be secured to the corresponding lateral boundaries of sheet 16 at the respective interface therebetween in any analagous manner so as to facilitate retention of the processing fluid intermediate sheet 16 and element 11.

Upon superpositioning of opaque sheet 18 contiguous exposure surface 19 of element 11, formation of the thus-formed laminate's integrity may be maintained during processing by mechanical means such as, for example, a plurality of polymeric hooks, e.g. nylon hooks, appropriately positioned on one contact surface and a plurality of filamentary loops on the second contact surface, such as the closure materials sold by Velcro Corporation, Manchester, N.H., or continuous or discontinuous adhesive layer or layers coacting to form a seal between sheet 18 and exposure surface 19 of element 11 to thereby facilitate processing external the camera in the presence of actinic radiation. Such adhesive means may comprise a commercial pressure-sensitive adhesive such as that sold by the National Cash Register Co., Dayton, Ohio, under the trade designation PO1B–101 as a pressure activated capsular adhesive, and the like, so employed that the elements may be readily separated upon completion of processing by application of minimal force to the respective components.

Tapered end sections 22 and 23 cooperate to define the leading end section of film unit 10 to be advanced between the pressure-applying members as further detailed hereinafter.

The length of sheets 16 and 18 is substantially equal and by virtue of this arrangement, the sheets are readily superposed in registered relation during the processing of the film unit. A trailing end section 25 of sheet 16 extends beyond the trailing edge 26 of element 11 to coact with trailing end section 27 of sheet 18 to trap any excess processing fluid which may be carried beyond the trailing ends of the photosensitive element 11 during distribution of the processing fluid. Distribution of the processing fluid, as noted, is effected by advancing sheets 16 and 18 and container 21 of processing fluid, the former in superposition, relative to and between a pair of juxtaposed pressure-applying members 29 and 30. The pressure-applying members, e.g., opposed suitably gapped rolls, apply compressive pressure to the sheets progressively, commencing in the area of the container, to cause the ejection of the fluid contents of the container between and in contact with the opposed surfaces of the sheet 16 and element 11. To aid in trapping of excess fluid, spacing members 31 may be provided on trailing end section 27 adjacent the margins thereof for spacing apart the pressure-applying members to provide a gap between trailing end section 25 of sheet 16 and trailing end section 27 of sheet 18 in which any excess processing fluid may be collected and retained.

The rupturable container is of the type shown and described in U.S. Pats. Nos. 2,543,181; 2,634,886; 2,653,-732; 2,674,532; 2,702,146; 2,723,051; 2,750,075; 3,056,-491; and 3,056,492, and may comprise a rectangular blank of fluid- and air-impervious sheet material folded longitudinally upon itself to form two walls which are sealed to one another along the longitudinal and end margins to form a cavity in which the processing fluid is contained. Longitudinal marginal seal 32 is made weaker than the end seal so as to become unsealed in response to hydraulic pressure generated within the fluid contents of the container by the application of compressive pressure to the walls of the container. Container 21 is mounted on opaque sheet 16 with the longitudinal marginal seal directed toward the leading edge 33 of element 11. Bib sheet 34 is secured to opaque sheet 16 at lateral edges 35 and 36, center area 37, trailing edge 38 of container 21, and leading edge 33 of element 11, and facilitates restricted unidirectional flow of fluid contents 39 upon compressive rupture of container 21. Edge 40 of bib sheet 34 extends beneath leading edge 33 of element 11. Thus, the flow of fluid contents 39 from container 21 is directed beneath bib sheet 34 and distributed intermediate element 11 and opaque back sheet 16.

For details concerning the composition of the fluid and materials useful in forming the additive multicolor image, reference may be had to aforementioned U.S. Pat. No. 2,614,926 and copending applications Ser. Nos. 736,796, filed June 13, 1969; 889,656, filed Dec. 31, 1969; 889,657, filed Dec. 31, 1969, 889,660, filed Dec. 31, 1969; and 889,636, filed Dec. 31, 1969 (aforementioned U.S. Pats. Nos. 3,536,488; 3,615,427; 3,615,429; and 3,615,-426).

A film pack or assemblage of film units 10 is shown in FIGS. 3 and 4 of the drawings. This film pack, designated 41, comprises a generally parallelepiped-shaped container or box 42 for holding and enclosing a plurality of film units 10. Container 42 is shown as comprising two sections, including a forward section having a forward wall 43, side walls 44, a trailing end wall 45, and a leading end wall 46. Forward wall 43 is provided with a generally rectangular exposure aperture 47 for transmitting light for exposing the photosensitive sheets of film units carried within the container. Leading end wall 46 comprises only a partial wall, i.e., it does not extend rearwardly to the same extent as the side walls, which cooperates with the rear section of the container to provide a passage 48 at the leading end of the container through which film units 10 carried by the container are withdrawn. The rear section of the container comprises a rear wall 49 secured to side walls 44 and formed preferably of a resilient sheet metal.

Figure 5:
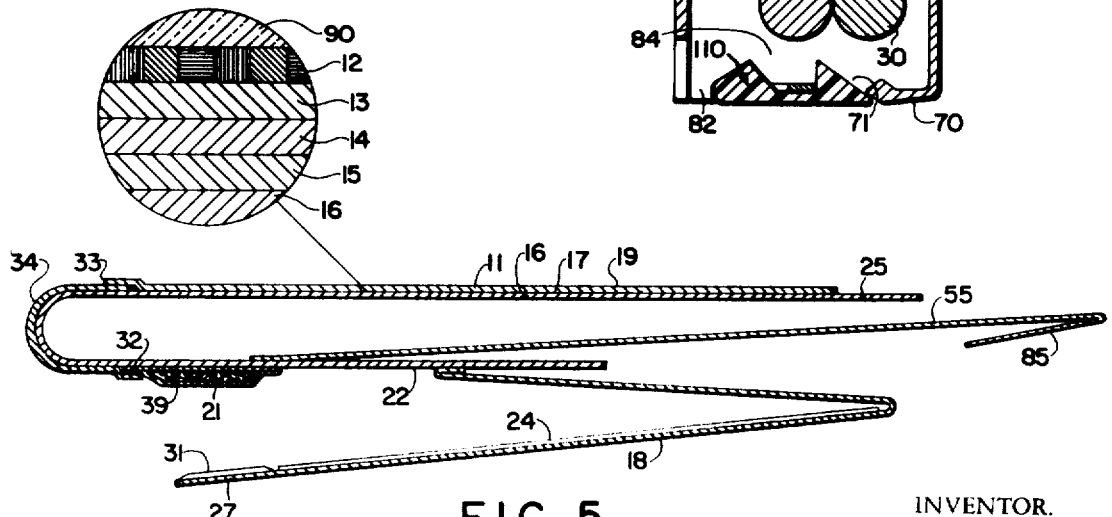
FIG. 5 is a diagrammatic sectional view taken substantially midway between the sides of the film pack showing one film unit with the components thereof spaced apart to more clearly illustrate the construction and arrangement of the film unit.

The arrangement of each film unit within container 41 is illustrated in FIGS. 1 and 5; and the arrangement of a plurality of film units (two are shown) is illustrated in FIG. 4. Each film unit is arranged with the photosensitive and second sheets in overlying relation with the additive color screen 12 of element 11 facing outward and with the surface of the opaque sheet 18 which is superposed therewith, during processing facing inwardly in the same direction. Leading end section 20 of sheet 16 is folded or curved adjacent the leading edge 33 of element 11 intermediate that edge and container 21, and leading end section 23 of sheet 18 is similarly folded adjacent the leading edge of the sheet so that leading portions of leading end sections 20 and 23 interconnect sheets 16 and 18 in the spacial arrangement which positions element 11 therebetween upon superpositioning of the sheets; and trailing end section 25 of sheet 16 is disposed adjacent, respectively, trailing end section 27 of sheet 18. The film pack is provided with a generally flat, rectangular pressure plate 50 located intermediate opaque sheet 16 and the other portions of the film unit for supporting element 11 against the inner surface of forward wall 43 in position for exposure through aperture 47. Pressure plate 50 includes a rolled end section 51 around which extends the curved portion of sheet 16. Rolled end section 51 is provided for guiding photosensitive element 11 around the end of the pressure plate in a manner to be described hereinafter. The major portion of first section 20 of sheet 16, rupturable container 21 mounted thereon, tapered section 22 and the leading tapered end section 23 of sheet 18 are located behind pressure plate 50 between the latter and sheet 18. Pressure plate 50 is provided with lateral flanges 52 disposed adjacent side walls 44 of the container. Rear wall 49 of the housing is provided with springs 53 formed from the rear wall and biased inwardly for engaging lateral flanges 52 and biasing pressure plate 50 toward forward wall 43 to retain element 11 in position for exposure. Rear wall 49 is also provided with a U-shaped opening or enlarged notch 54 in the end portion thereof adjacent opening 48, the purpose of opening 48 to be further described hereinafter.

Figure 7:
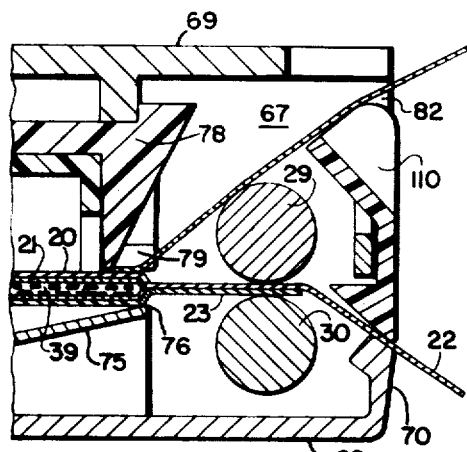
FIG. 7 is a fragmentary sectional view, similar to FIG. 6, illustrating initiation of an initial passage of one film unit between a pair of opposed pressure-applying rolls during removal of the film unit from the camera apparatus of FIG. 6, subsequent to photoexposure.

The means for withdrawing each film unit 10 from container 41 with element 11 and opaque sheet 18 in superposition and advancing tapered end sections 22 and 23 between a pair of pressure-applying members comprises a relatively narrow elongated leader 55 secured at the trailing end of the leader to tapered end section 22 of sheet 16 preceding the point of attachment of the tapered end section 22 to tapered end portion 23 of sheet 18. Leader 55 is of substantially uniform width throughout its length. The areas of adherence of leader 55 to tapered end section 22 extend substantially in the direction of movement of the leader, and comprise any suitable adhesive material which will form a bond preferably at least equal in strength to the sheet materials (paper) comprising the leader and tapered end section, sufficient in resistance to the application of tension, in a direction of the plane of tapered end section 22, to prevent shearing. The adhesive bond is such that the application of a suitable shearing force to leader 55, effective by applying tension to the leader in a direction at an angle from the plane of tapered end section 22, causes leader 55 to disengage from contact with tapered end section 22. By virtue of this construction, as long as the leader and film unit coupled therewith are being moved in approximately the same direction, then the leader is in tension and does not fail. However, when the direction of movement of leader 55 and tapered end section 22 diverges sufficiently (as shown in FIG. 7), the trailing end section of the leader is subjected to a shearing force which causes the leader to tear and thereby become detached from tapered end section 22.

Leader 55 extends from container 41 through opening 48 therein and, when drawn from the container, advances element 11 around rolled end section 51 of pressure plate 50 into superposition with a second sheet 18 and then advances the two sheets in superposition within the container towards opening 48. As leader 55 commences to advance towards opening 48, tapered end section 22 of sheet 16 is required to commence rolling upon itself toward the opening in response to movement of tapered end section 22 of sheet 16 toward the same opening. It is for this reason that section 22 and portion 23 are tapered, since this provides for the weakest portion of end portion 22 in the area where the end portion is required to commence rolling. Means are also provided for preventing movement of elements underlying the foremost element 11 as the latter is moved from exposure position around the end of the pressure plate. This means comprises an end section 73 of pressure plate 50 to which are attached corner portions 74 of trailing end section 25. Corner portions 74 may be precut, as shown, to insure separation from the remainder of trailing end section 25 and may be secured to end section 73 of the pressure plate by suitable means such as staples.

Film pack 41 is provided with means for initially sealing aperture 47 against the admission of light until the pack has been loaded into the camera in which it is to be employed. This light-sealing means comprises a cover sheet 56 (double of a light-impervious material located between the foremost photosensitive sheet and forward wall 43 across opening 47. Cover sheet 56 extends around the curved end of the pressure plate behind the latter to a position against rear wall 49 with the leading end of the cover sheet located adjacent passage 48. An elongated leader section 57, similar to leader 55, provides means for withdrawing cover sheet 56 from container 41 after the container has been loaded into a camera.

The film units incorporating the invention and comprising film pack 41 are adapted to be employed in photographic apparatus such as a hand-held camera 157, illustrated in FIGS. 6 through 9 of the drawings. Camera 157 comprises a housing including a forward section 58 having a forward wall 59 with a recessed or reentrant section 60 and an aperture 61 in the reentrant section for transmitting light for exposing element 11 of a film pack positioned for exposure within the camera. A hinged door 62 is provided for covering recessed section 60 and for mounting a conventional lens and shutter assembly 63, the latter being connected to recessed section 60 by a collapsible bellows 64 secured at one end of the lens and shutter assembly and secured at its other end to the recessed section in surrounding relation to aperture 61. In lieu of door 62, lens and shutter assembly 63 and bellows 64, the camera housing can be constructed in the form of a camera or film pack adaptor intended to be mounted on or coupled with a camera or other photographic exposure device.

The camera housing includes a rear section 65 having a rear wall 66 and side walls 67 cooperating with forward housing section 58 to provide a chamber 68 to the rear of forward wall 59 and aperture 61 for containing the film pack in position for exposure through aperture 61. Film pack 41 is mounted within chamber 68 with the wall of the pack located against the rear surface of reentrant section 60 and with aperture 47 in the forward wall of the pack aligned with aperture 61. Rear housing section 65 is preferably pivotably secured to forward housing section 58 adjacent one end of the housing, herein shown and designated for purposes of description as the upper end, by a hinge which permits the two housing sections to be moved apart from one another to allow loading of a film pack into chamber 68. The camera housing includes a lower end wall comprising end wall 69 on forward housing section 65 and another end wall 70 on rear housing section 58. A film withdrawal passage 71 is provided in lower end wall of the housing to permit withdrawal of a film unit from the housing. Suitable latch means (not shown) of a conventional type are also provided in the lower portion of the housing for retaining the two housing sections together in the closed or operative position shown in the drawings.

Camera 57 includes a pair of juxtaposed pressure-applying members in the form of pressure-applying rolls 29 and 30 within chamber 68 adjacent film withdrawal passage 71. Pressure-applying rolls 29 and 30 are mounted for pivotal movement with their axes substantially in a common plane, and resilient means are provided for biasing the rolls toward one another into juxtaposition so as to apply compressive pressure to a film unit during movement thereof between the rolls. The pressure-applying rolls cooperate to form a convergent (and divergent) passage through which the film unit is moved for effecting the processing of the film unit, and this passage between the pressure-applying rolls is located in substantial alignment with withdrawal passage 71. In the arrangement of the pressure-applying rolls shown in the drawings, both rolls are mounted on rear housing section 65 so that when the housing sections are pivoted apart from one another, an assemblage of film units may be loaded into the camera with the leaders thereof extending from the camera past and to one side (forward) of the pressure-applying rolls. Portions of end walls 69 and 70 cooperate to define an opening 82 between the forward and rear housing sections through which the leaders extend from the camera housing.

Camera, 157 includes means for guiding tapered end section 22 of film unit 10 between pressure-applying rolls 29 and 39 in response to withdrawal movement of leader 55 past roll 29 to the front thereof and through opening 71. In the form shown in FIG. 6, this guide means comprises a guide bar 75 mounted on rear housing section 65 closely adjacent roll 29 and having a substantially straight guiding edge extending from side to side of the camera housing and lying substantially in a plane through the convergent passage between pressure-applying rolls 29 and 30, i.e., tangent to the rolls. Section 76 of guide bar 75, comprising the forward edge of the guide bar is located with its forward edge approximately in line with the rearwardmost portion of roll 29, and guide bar 75 may be provided with facing end surfaces spaced from one another by a distance slightly greater than the width of leader 55. A guide plate 78, approximately equal in length to the width of leader 55, including facing end sections 79 spaced from one another by a distance slightly greater than the width of leader 55, is mounted on forward housing section 58, and extends toward the rear of the camera adjacent guide bar 75 at its forwardmost extremity 76. The rearmost edge of guide plate 78 may be curved, where desired. Guide bar 75, facing end sections 79, and guide plate 78 cooperate with one another to define a guide passage extending generally in a direction toward end wall 70 of the camera and having a width, measured from side to side of the camera, just slightly greater than the width of leader 55, so that the leader may be moved through passage 82. It will be noted that tapered end section 22, at the leading edge thereof, is wider than leader 55 so that tapered end section 22 is unable to enter said guide passage. Facing surfaces 79 of guide plate 78 function to guide tapered end section 22 of the film unit into the convergent passage between pressure-applying rolls 29 and 30.

In the loading and operation of the camera, the forward and rear housing sections are pivoted apart from one another and a film pack 41 is positioned within the forward housing section 58 with the forward wall 43 of pack 41 resting against section 60 of the forward wall 59 of forward housing section 58, and with leaders 55 and leaders 57 projecting from the pack extending across and to the rear of guide plate 78 and end wall 69. Rear housing section 65 is then pivoted into the operative position shown, causing the intermediate section 79 of guide bar 79 to engage the leaders displacing them forwardly so that they extend through the guide passage toward the forward wall of the camera, past pressure-applying roll 29 and through opening 82 in end walls 69 and 70. As a leader 55 is withdrawn from the camera through opening 82, the tapered end section is withdrawn from the pack and, being unable to enter the guide passage, is guided by the guide bar, guide members and guide plate into the convergent passage between the pressure-applying rolls.

Film withdrawal passage 71, in the lower end wall 70 of the camera housing, is at least equal in width to the width of the film unit, whereas passage 82 need be of a width only sufficient to allow the passage of leaders 55. It is desirable to allow only one leader at a time to project from the camera where the leader may be grasped; and this is desirable to prevent the operator from accidentally pulling the wrong leader, or pulling more than one leader at a time. For this purpose, end wall 70 is provided with a recess, designated 84, adjacent passage 82 for holding the leading end sections of leaders 55. The leading end sections, designated 85, of leaders 55, are folded back upon themselves and each leading end section is detachably adhered to the leader of the preceding film unit, with the leading end section 85 of the first (to be exposed) film unit being attached to leader 56. The folded leading end sections 85 of leaders 55 are contained within recess 84 which is provided with a deplaceable guide bar element 110. As leader 56 or a leader 55 is withdrawn through opening 71, the leading end section 85 of the next succeeding leader 55 is unfolded and withdrawn from recess 84 where the leading end section may be grasped for pulling the leader from the camera. By virtue of this arrangement, only one leader at a time extends outside of recess 84 in position to be engaged and withdrawn.

In the operation of the film unit of the invention, leader 55 is pulled from the camera advancing tapered end section 22 and tapered end portion 23 between pressure-applying rolls 29 and 30 to the position shown in FIG. 7 at which leader 55 extends from its point of attachment to tapered end section 22 at almost a right angle from the plane of the tapered end section. At this position, the leadig end of tapered end section 22 projects through passage 71 a sufficient distance to permit the tapered end section to be grasped, and the application of a continued pulling force on leader 55 results in the exertion of a shearing force to leader 55 at the areas where the leader is attached to the tapered end section and results in separation of the leader at these areas.

Figure 8:
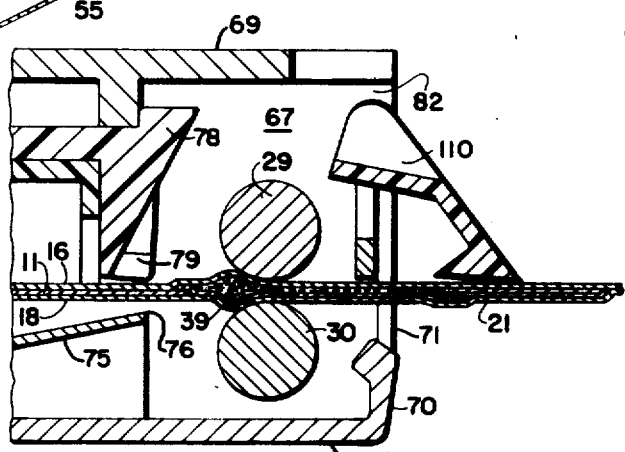
FIG. 8 is a fragmentary sectional view, similar to FIG. 7, illustrating further passage of the film unit between the pair of opposed pressure rolls, rupture of the frangible container and distribution of its fluid processing composition contents between, and in contact with, the opposed surfaces of the superposed sheet elements of the film unit.

Application of withdrawing force on tapered end section 22, advancing element 11, second sheet 18 and container 21 between pressure-applying rolls 29 and 30 to the position shown in FIG. 8 provides rupture of the longitudinal marginal seal 32 of container 21 and unidirectional release of fluid processing composition 39 between and in contact with opposed surfaces of photosensitive element 11 and opaque sheet 16.

As previously mentioned, opaque sheet 16 may be directly or indirectly laminated to surface 17 of photosensitive element 11, for example, as illustrated, to surface 17 of photosensitive silver halide layer 15 opposite exposure surface 19 and the structural integrity of the laminate maintained, at least in part, by the adhesive capacity exhibited between the various layers comprising the laminate at their opposed surfaces. However, the adhesive capacity exhibited at an interface intermediate opaque sheet 16 and the next adjacent essential layer, for example, as illustrated, between opaque sheet 16 and photosensitive silver halide layer 15 should be less than that exhibited at the remaining interfaces between opposed surfaces of the laminate, in order to facilitate the preferred spacial distribution of processing composition intermediate the opaque sheet and next adjacent essential layer.

Figure 9:
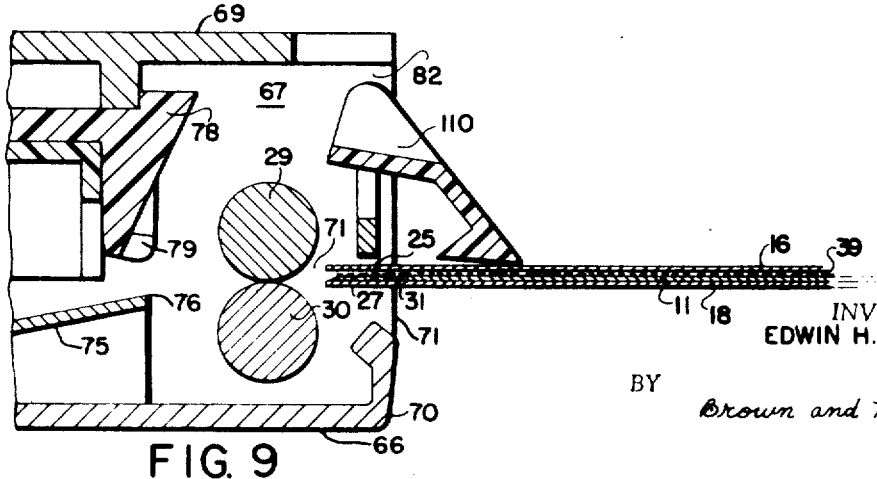
FIG. 9 is a fragmentary sectional view, similar to FIG. 8, illustrating completion of the passage of the film unit between the pair of opposed pressure rolls, the laminate formed by distribution of the fluid processing composition between the superposed sheet elements.
Figure 2:
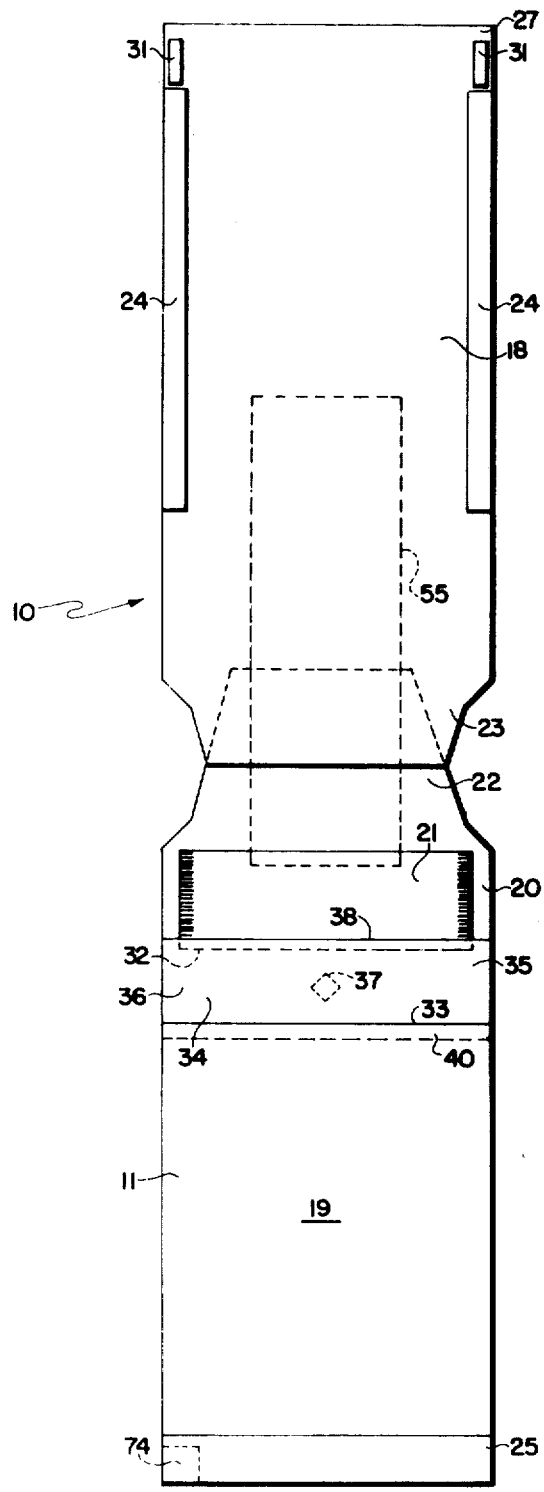
FIG. 2 is a plan view of the film unit of FIG. 1.
Figure 6:
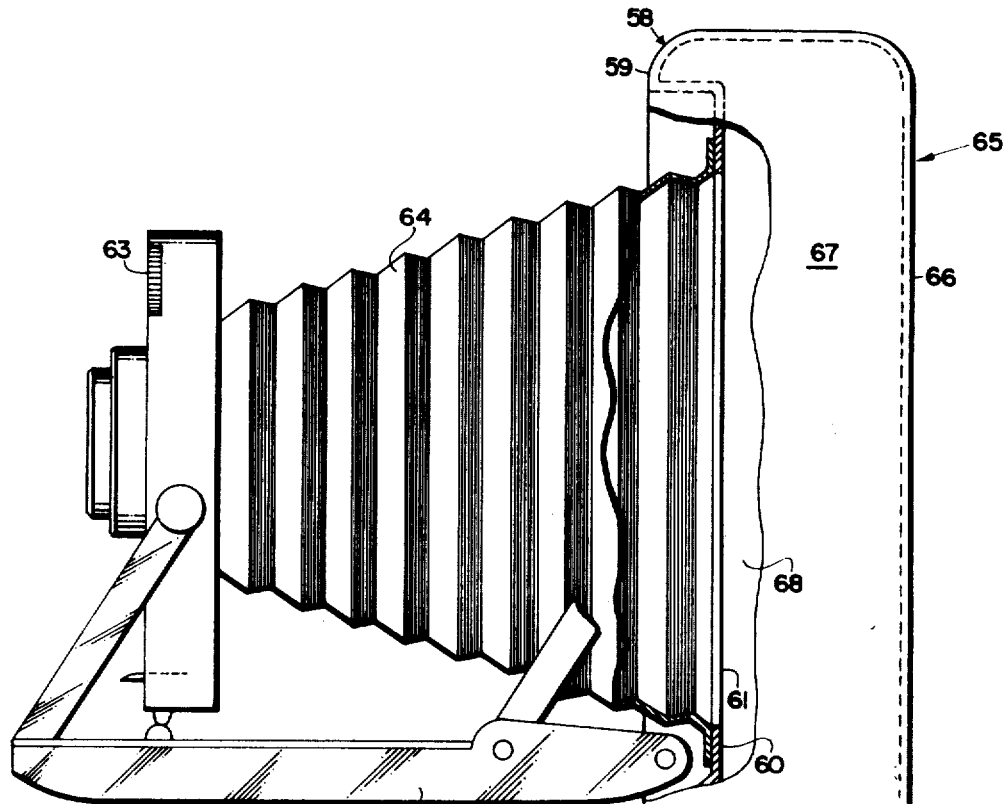
FIG. 6 is an elevational view, partially in section, of photographic apparatus in the form of a camera for employing film units embodying the invention.

Continued withdrawing force on film unit 10 between pressure-applying rolls 29 and 30 to the position shown in FIG. 9 provides interengagement under pressure between opaque sheet 18 and exposure surface 19 of photosensitive element 11, and sheet 18 may be maintained in superposed relationship with element 11 during processing external camera 157 by any suitable fastening or retaining means such as, for example, a pressure-sensitive contact adhesive disposed on contact surface 24 of sheet 18 and/or exposure surface 19 of element 11, or mechanical interengaging members, and the like, adapted to maintain the respective elements in contiguous relationship during the period of processing external camera 157. In one embodiment, rail elements 24 may carry on the external surface a pressure-sensitive contact adhesive adapted to maintain the respective elements in coextensive face-to-face relationship upon superpositioning between the contact surfaces thereof.

Where desired, the various layers and elements of the film unit, including specifically support 90, the processing composition, which may be susceptible to edge leakage and/or light piping of incident radiation actinic to photosensitive layer 15 during processing external camera 157, may have disposed therein opacifying agent such as carbon black, titanium dioxide, and the like, in a concentration sufficient to prevent induction of physical photographic fog formation resultant from incident actinic radiation, but insufficient to interfere with the effective additive multicolor recordation functionality of the film unit.

As indicated above, photosensitive additive color film element 11 is composed of a photoresponsive material, such as a photosensitive silver halide emulsion, preferably, a panchromatically sensitized emulsion, a silver diffusion transfer receiving layer associated therewith, i.e., a layer in which a silver image is adapted to be formed by diffusion transfer processing. Suitable elements include those described in the aforementioned U.S. Pats. Nos. 2,726,154; 2,614,926; and 2,944,894 and applications Ser. Nos. 736,796, filed June 13, 1967 and 889,656; 889,657; 889,660; and 889,636, all filed Dec. 31, 1969 (aforementioned U.S. Pats. Nos. 3,536,488; 3,615,427; 3,615,428; 3,615,429; and 3,615,426).

Referring to FIG. 5 there is shown a diagrammatic enlarged cross-sectional view of element 11 constructed in accordance with a preferred embodiment of the present invention. The film unit is shown to specifically comprise a flexible transparent film base or support member carrying on one surface, in order, an additive color screen 12 comprising a geometrically repetitive plurality of actinic radiation-filtering colored elements including a set or group of primary red-colored filter elements, a set of primary blue-colored filter elements and a set of primary green-colored filter elements arranged in a repetitive distribution in side-by-side relationship in a substantially single plane, a silver diffusion transfer image-receiving layer 13 comprising silver precipitating nuclei, a stripping layer 14 and a photosensitive silver halide stratum 15. In the preferred embodiment of the invention illustrated, the photoinsensitive image-receptive layer 13 is thus shown positioned intermediate color screen 12 and photosensitive stratum 15 and the latter accordingly positioned for expeditious separation from the remainder of the element subsequent to processing.

Subsequent to removing the film unit from the camera and formation of the silver transfer image, the transparency is obtained by separating element 11 from the remainder of the film unit by stripping opaque sheet 18 to expose element 11 and removing opaque sheet 16. The thus-formed transparency is now suitable for projection in a suitable device. Optionally, it may be desirable to provide mounting, i.e., adhering element 11 at the edges to a substantially rigid frame or mount of the type conventionally employed with transparencies for easy insertion into projectors.

As described above, element 11 may be employed intact as a transparency subsequent to separation from the film unit. In alternative embodiments, various treatments may be applied to said element to enhance the photographic properties and stability of the image produced therein. For example, in order to remove at least some of the residual reagents remaining therein, element 11 may be washed with, for example, tap water, by immersion or by positioning element 11 under a flowing stream of water.

In a particularly preferred embodiment, the layer distal to the additive color screen, that is adjacent to opaque sheet 16, is the photosensitive emulsion layer 15, and the emulsion layer, subsequent to processing, exhibits greater adhesion to the sheet than to the next adjacent layers of element 11 whereby removal of sheet 16 also serves to remove the layer 15 thus increasing visual acuity and brightness of the transparency and enhancing stability of the element by virtue of removal of residual processing reagent in the photosensitive layer. In a particularly preferred embodiment, a stripping layer 14 is employed to facilitate removal of the photosensitive layer. Materials useful as stripping layers in film units are known to the art, and they include, for example, materials which are attacked or softened by alkaline solutions employed in the photographic processing compositions. As examples, mention may be made of cellulose acetate hydrogen phthalate and acid functional waxes such as methyl acrylate/acrylic acid copolymer.

In still a further embodiment, photosensitive layer 15 may be removed, subsequent to processing and stripping of opaque sheet 16, by conventional washing techniques.

The silver precipitating nuclei may be disposed within the photosensitive silver halide stratum of the film unit assemblage, in a separate layer or layers contiguous one or both surfaces of the silver halide stratum and the silver halide stratum may comprise two or more silver halide strata, each optionally retaining silver precipitating nuclei, and may include a separate silver precipitating nuclei layer positioned intermediate separate silver halide strata.

For the purpose of insuring the production of a positive image possessing a high covering power, the silver precipitation nuclei will be disposed within the film unit in a concentration per unit area effective to cause image silver derived from unexposed silver halide crystals to possess the desired opacity per given mass of in situ reduced silver.

In general, silver precipitating nuclei comprise a specific class of adjuncts well known in the art as adapted to effect catalytic reduction of solubilized silver halide specifically including heavy metals and heavy metal compounds such as the metals of Groups I-B, II-B, IV-A, VI-A, and VIII and the reaction products of Groups I-B, II-B, IV-A, and VIII metals with elements of Group VI-A, and may be effectively employed in the conventional concentrations traditionally employed in the art, preferably in a relatively low concentration in the order of about $1-25 \times 10^{-6}$ moles/ft.$^2$.

Especially suitable as silver precipitating agents are those disclosed in U.S. Pat. No. 2,698,237 and specifically the metallic sulfides and selenides, there detailed, these terms being understood to include the solenosulfides, the polysulfides, and the polyselenides. Preferred in this group are the so-called "heavy metal sulfides." For best results it is preferred to employ sulfides whose solubility products in an aqueous medium at approximately 20° C. vary between $10^{-23}$ and $10^{-30}$, and especially the salts of zinc, copper, cadimum and lead. Also particularly suitable as precipitating agents are heavy metals such as silver, gold, platinum and palladium and in this category the noble metals illustrated are preferred and are generally provided in the matrix as colloidal particles.

In the practice of the present invention, the photographic film unit, which comprises a color screen in association with a photosensitive silver halide layer having associated therewith silver precipitating nuclei, is exposed to incident radiation actinic to the silver halide wherein the exposure of the emulsion is effected by radiation traversing through the color screen and the processing of the film is accomplished by contact, subsequent to exposure, with an aqueous processing composition, containing a silver halide developing agent and a silver halide solvent, to provide to the film unit the direct formation of a silver image possessing required low silver image optical density, in terms of exposed areas of the film unit, and required high silver image optical density, in terms of unexposed areas of the film unit, as a function of exposure and development of the film unit.

Color photographic reproduction may thus be provided by exposing the above described photoresponsive silver halide stratum, to selected subject matter, through an optical screen element possessing filter media or screen elements of selected radiation modulating characteristics such as filter media selectively transmitting predetermined portions of the electromagnetic radiation spectrum's visible segment. The color information thus recorded is read out by viewing resultant image conformation through the same or a similar screen element in appropriate registration with the image. The individual filter media or screen elements constituting the optical screen will be constructed to effect selective filtration of predetermined portions of the visible electromagnetic spectrum substantially corresponding to its red, blue and green regions and color information recordation will be accomplished by point-to-point incidence of radiation actinic to the selected photoresponsive material as modulated by such screen element. Visual reproduction of the information content recorded is accomplished by read out of the impressed image as modulated by the original or a substantially identical screen element in accurate registration with the image record.

Although for color information recordation purposes, the photoresponsive material and optical screen may comprise separate and distinct elements appropriately registered during periods of exposure and viewing and the optical screen element may be temporarily or permanently positioned on the surface of a transparent carrier opposite that retaining the photoresponsive material, for practical purposes, it is preferred to permanently position the photoresponsive material in direct contiguous relationship to the color screen during exposure, in order to maximize the acuity of the resultant image record.

Subsequent to exposure of the photoresponsive material to actinic radiation transmitted through and filtered by the optical screen, the resultant photoexposed element may be further processed in accordance with the materials selected and generally without regard to the filter screen when the latter element is stable with respect to and/or protected from contact with the processing compositions and components selected. Such protection and stability will ordinarily be enhanced and facilitated by disposition of the filter screen between a transparent, processing composition impermeable carrier and the photoresponsive mateial, and, in particular where such configuration additionally includes the presence of a processing composition barrier element or layer intermediate the screen and the photoresponsive material.

The preferred film assemblages will comprise a panchromatically sensitized silver halide stratum possessing the parameters previously set forth positioned contiguous a surface of the multicolor additive color screen which, in the preferred assemblage denoted above, may also possess the image-receiving component intermediate a silver halide stratum and the color screen, to allow exposure of the emulsion to be accomplished through a color screen, including through a transparent supporting member, if present, and formation of the requisite positive silver image in immediate, contiguous relationship to the color screen employed during exposure. Such embodiment obviates the necessity of registering the color screen with the resultant positive silver image, for viewing purposes, in that the screen employed for exposing may also be employed for viewing and is in automatic registration with the positive silver image.

Thus a preferred embodiment of the present invention for the reproduction of color information in accordance with the principles of additive color photography may comprise a film unit assemblage which contains an additive multicolor screen comprising a geometrically repetitive plurality of actinic radiation-filtering colored elements including a set of primary blue-colored filtered elements, a set of primary green-colored filter elements and a set of a primary red-colored filter elements arranged in a repetitive distribution in side-by-side relationship in a substantially single plane positioned intermediate a transparent support member and a photosensitive silver halide stratum conforming to the parameters set forth above and having silver precipitating nuclei associated therewith in any of the manners previously detailed.

It will be specifically recognized, however, that in embodiments of the invention which employ a separate photoinsensitive silver precipitating nuclei containing layer, intermediate a color screen and a photosensitive silver halide layer, such nuclei containing layer should most preferably possess a thickness of less than about a wavelength of light so that for all practical optical purposes the photosensitive silver halide emulsion layer will be effectively located next adjacent the color screen whereby minimizing to a maximum extent any possible optical parallex problems during radiation transmission, as well as any substantial lateral diffusion of silver image-forming components during processing of the film unit.

The photoresponsive silver halide materials employed in the practice of the present invention will, as previously described, comprise a crystal of a compound of silver, for example, one or more of the silver halides, such as photosensitive silver chloride, silver iodide, silver bromide, and preferably, mixed silver halides, such as silver chlorobromide, silver iodochloride, silver iodobromide or silver iodochlorobromide, of varying halides ratios and the silver concentrations dispersed in a processing composition permeable binder material such as gelatin and the like, most preferably silver iodobromide and iodochlorobromide, particularly that comprising about 1 to 9% iodide by weight of silver.

The preferred silver halide type photosensitive layers employed for the fabrication of the photographic film unit, may be prepared by reacting a water-soluble silver salt, with ammonium, potassium or sodium chloride, preferably together with corresponding iodide and bromide, in an aqueous solution of a peptizing agent such as colloidal gelatin solution; digesting the dispersion at an elevated temperature, to provide increased crystal growth; washing the resultant dispersion to remove undesirable reaction products and residual water-soluble salts, for example, employing the preferred gelatin matrix material, by chilling the dispersion, noodling the set dispersion, and washing the noodles with cold water, or, alternatively, employing any of the various floc systems, or procedures, adapted to effect removal of undesired components, for example, the procedures described in U.S. Pats. Nos. 2,614,928; 2,614,929; 2,728,662, and the like; after ripening the dispersion at an elevated temperature in combination with the addition of gelatin or such other polymeric material as may be desired and various adjuncts, for example, chemical sensitizing agents and the like; all according to the traditional procedures of the art, as described in Neblette, C. B. Photography—Its Materials and Processes, 6th ed., 1962.

Optical sensitization and preferably panchromatic sensitization of the emulsion's silver halide crystals may then be accomplished by contact with optical sensitizing dye or dyes; all according to the traditional procedures of the art, or described in Hamer, F. M., The Cyanine Dyes and Related Compounds.

Subsequent to optical sensitization, any further desired additives, such as coating aids and the like, may be incorporated in the emulsion and the mixture coated according to the conventional photographic emulsion coating procedures known in the art.

As the binder for the photoresponsive material, the aforementioned gelatin may be, in whole or in part, replaced with some other natural and/or synthetic processing composition permeable polymeric material such as albumin; casein; or zein or resins such as cellulose derivative, as described in U.S. Pats. Nos. 2,322,085 and 2,541,474; vinyl polymeric such as described in an extensive multiplicity of readily avaliable U.S. and foreign patents or the photoresponsive material may be present substantially free of interstitial binding agent as described in U.S. Pats. Nos. 2,945,771, 3,145,566; 3,142,567; Newman, Comment on Non-Gelatin Film, B.J.O.P., 434, Sept. 15, 1961; and Belgian Pats. Nos. 642,557 and 642,558.

The silver precipitating nuclei and/or discrete nuclei layer or layers may be realized by the application of, location of, and/or in situ generation of, the nuclei, which may be similar or dissimilar, directly or indirectly in or as the respective layer and in the presence or absence of binder or matrix material and, in the latter instance, may comprise one or more adjacent or separate strata of a permeable material containing one or more nuclei types disposed in one or more such layers. Matrix materials adapted for such employment may comprise both inorganic and organic materials, the latter type preferably comprising natural or synthetic, processing composition permeable, polymeric materials such as protein materials, for example, glues, gelatins, caseins, etc.; carbohydrate materials, for example, chitins, gums, starches, alginates, etc.; synthetic polymeric materials, for example, of the vinyl or cellulosic types such as vinyl alcohols, amides and acrylamides, regenerated celluloses and cellulose ether and esters, polyamides and esters, etc., and the like; and the former type preferably comprising submacroscopic agglomerates of minute particles of a water-insoluble, inorganic, preferably siliceous material such, for example, as silica aerogel as disclosed in U.S. Pat. No. 2,698,237.

Where the silver precipitating agent is one or more of the heavy metal sulfides or selenides, it may be preferable to prevent the diffusion and wandering of the sulfide or selenide ions, as the case may be, by also including, in the silver precipitating layers or in separate layers closely adjacent thereto, at least one metallic salt which is substantially more soluble in the processing agent than the heavy metal sulfide or selenide used as the silver precipitating agent and which is irreducible in the processing agent. This more soluble salt has, as its cation, a metal whose ion forms sulfides or selenides which are difficultly soluble in the processing agent and which give up their sulfide or selenide ions to silver by displacement. Accordingly, in the presence of sulfide or selenide ions the metal ions of the more soluble salts have the effect of immediately precipitating the sulfide or selenide ions from solution. These more soluble or ion-capturing salts may be soluble salts of any of the following metals: cadmium, cerium(ous), cobalt(ous), iron, lead, nickel, manganese, thorium and tin. Satisfactory soluble and stable salts of the above metals may be found, for example, among the following groups of salts: the acetates, the nitrates, the borates, the chlorides, the sulfates, the hydroxides, the formates, the citrates and the dithionates. The acetates and nitrates of zinc, cadmium, nickel, and lead are preferred. In general, it is also preferable to use the white or lightly colored salts although for certain special purposes the more darkly colored salts may be employed.

The previously mentioned ion-capturing salts may also serve a function of improving the stability of the positive image provided they possess, in addition to the aforementioned characteristics, the requisites specified in U.S. Pat. No. 2,584,030. For example, if the ion-capturing salt is a salt of a metal which slowly forms insoluble or slightly soluble metalllic hydroxides with the hydroxyl ions in the alkaline processing liquid, it will suitably control the alkalinity of the film unit to substantially, if not totally, prevent the formation of undesirable developer stains.

In accordance with a particularly preferred embodiment of the present invention, photosensitive and image-receiving strata carrying the image silver are fabricated to substantially prevent microscopic distortion of the image conformation by preventing microscopic migration or diffusion of image elements within the polymeric matrix. In general, conventional photographic image elements may ordinarily comprise a microscopically dynamic system without seriously noticeable disadvantages to the conventional employment of the image. However, for particularly accurate color reproduction in accordance with the principles of additive color photography, microscopic distortion of image elements is preferably obviated to insure maximization of the accuracy of image registration with the appropriate individual optical filter elements of the additive color screen associated with the image-carrying element. Specifically, it has been found that a photosensitive film unit comprising photosensitive emulsion containing silver halide crystals and silver precipitating nuclei dispersed in a polymeric binder and where employed photoinsensitive image-receiving layers containing silver precipitating nuclei dispersed in a polymeric binder, the binders of which possess a lattice effective to substantially prevent microscopic migration or diffusion of image silver, provide color reproduction acuity particularly desired for effective color reproduction in the manner previously described.

The desired polymeric binder lattice property may be readily achieved by selection of a polymeric material possessing the property of sufficiently fixing spacially image components, or a polymeric material, otherwise desired, may be modified, for example, by crosslinking and/or hardening, to the extent necessary to provide the desired spacial maintenance of image components, that is, a rigidity effective to maintain positive image components in registration with the individual optical filter elements of the color screen through which the photosensitive emulsion was exposed. For example, a preferred polymeric binder material, that is, gelatin, may be hardened by contact with conventional hardening agents to the extent necessary to provide the desired rigidification of the photographic image. When desired discrete particulate materials facilitating increased processing composition penetration of the photosensitive element, without deleterious effect on the polymeric matrix's lattice, may be advantageously incorporated in the photosensitive element for the purpose of expediting processing of the element.

Production of color screen, in accordance with the art may be prepared by totally mechanical means, as for example, by printing or ruling a dyeable substrate, for example, with a greasy ink formulation, in accordance with the desired filter pattern, subjecting the substrate to suitable coloration, in areas which not possess the repellant ink mask, effecting removal of the mask, and repeating this procedure, in accordance with the geometrical pattern of filter elements desired, a sufficient number of times to provide the desired multiplicity of diversely colored filter element; directly printing a carrier substrate with the desired dye formulations in accordance with the predetermined filter pattern and repeating this printing procedure a sufficient number of times to provide the multiplicity of colored filter elements desired, or depositing, as an irregular filter screen pattern, a thin layer comprising a random distribution of small grains, such as starch grains, which have been independently colored with the colors desired for optical filtering effects. Alternatively, color screen may be prepared by photomechanical methods of the type initially proposed by, for example, Ducos Du Hauron in the nineteenth century, which comprise, in general, coating a suitable support or film base with an adhesive composition having coated thereon a photosensitive colloid composition, as for example, dichromated gelatin, effecting exposure of the sensitive gelatin layer by incident actinic radiation, through a suitable mask which provides an exposure pattern devised in accordance with the desired optical filter element arrangement, effecting differential hardening of the sensitized material as a function of the point-to-point degree of exposure, removing unexposed unhardened material by solvent contact, subjecting the remaining hardened material to a suitable dyeing procedure in order to provide a first-colored optical filter element series, and repeating this procedure, employing appropriate masks, as often as necessary to provide the number of optical filter element types desired in the final color screen element.

Although color screen may be produced by traditional contact printing or projection type photomechanical processes, a particularly preferred process for the production of color screen comprises the process set forth in U.S. Pat. No. 3,284,208 which includes, in essence, successively coating the smooth surface of a lenticular film with a plurality of photoresponsive layers and sequentially subjecting the coatings to selectively displaced radiation incident on, and focused by, the lenticules receiving same, in order to provide selective exposure of the coating. Subsequent to each exposure, unexposed coating is removed and the resultant resist dyed in order to provide a series of chromatic filter elements, prior to the deposition of the next succeeding photoresponsive layer. Each such exposure is derived from electromagnetic radiation incident on the lenticular film at an angular displacement specifically adapted to provide the desired plurality of chromatic filter element series in substantial side-by-side or screen relationship and adapted to filter predertermined wavelengths of light.

For the preparation of the preferred trichromatic additive screens, the exposed area of each photoresponsive area will generally comprise about one-third of the layer contiguous each lenticule receiving exposing radiation. Although all three exposures may be accomplished by radiation incident on the lenticules of the lenticular film at three separate angles each adapted to provide exposure about one-third of the area contiguous each lenticule receiving radiation, it will be recognized that the terminal chromatic filter formation may also be provided by exposing the terminal photoresponsive layer to diffuse radiation traversing through the lenticular film and masked by the previously formed chromatic filter elements.

At a stage subsequent to formation of the first and second series of filter elements, the lenticular configuration will be constituted as a continuous smooth surface. In the instances where the lenticules comprise a separate stratum temporarily affixed to the surface of a support on which the color screen is formed, such separate stratum may be stripped from the support. Alternatively, where the lenticules comprise an integral component of the film base or support and have been provided to the base by pressure and/or solvent deformation of the base, a continuous smooth surface may be reconstituted by application of suitable solvent and the deformation pressures produced during the manufacturing of lenticular film base released to provide reconstitution of the base's original configuration. Where desired, for example, for optical transmission purposes, the reconstituted surface may be polished, for example, by surface contact with an appropriate rotating polishing cylinder or drum, for the time interval necessary to provide the desired optical characteristics to the film base surface.

Optionally the external surface of the color screen may be overcoated with a protective polymeric composition, such as nitrocellulose, cellulose acetate, and the like, for the purpose of protecting the screen from processing composition deformation during employment of the resultant film unit. The external surface of the color screen may then have applied thereto the remaining layers constituting the film assemblage as detailed hereinbefore.

Apparatus particularly adapted to facilitate effecting exposure of the lenticular film in accordance with the aforementioned U.S. Pat. No. 3,284,208 is disclosed and claimed in U.S. Pat. No. 3,318,220.

The photosensitive element support or film base employed may comprise any of the various types of transparent flexible supports, for example, polymeric films of both the synthetic type and those derived from naturally occurring products, etc. Especially suitable materials, however, comprise flexible transparent synthetic polymers such as polymethacrylic acid, methyl and ethyl esters; vinyl chloride polymers; polyvinyl acetals; polyamides such as nylon; polyesters such as the polymeric films derived from ethylene glycol terephthalic acid; polymeric cellulose derivatives such as cellulose acetate, triacetate, nitrate, propionate, butyrate, acetatebutyrate, or acetate propionate; polycarbonates; polystyrenes; and the like.

The opaque sheet materials may comprise flexible materials of the last-mentioned types which are opaque to incident radiation actinic to the photosensitive element. Particularly preferred sheet materials, however, have been found to comprise opaque paper products.

As denoted above, the photosenstive silver halide stratum and/or the silver precipitating nuclei containing stratum may have advantageously incorporated therein discrete particulate materials providing increased porosity to the film unit, without deleterious effect on the dimensional stability of the binder lattice, in particular, those materials which additionally act as an antiswelling agent for the binder material and, accordingly, act to facilitate the prevention of the carried image's microscopic distortion, particularly, with respect to an associated color screen, such as discrete silica particles dispersed, for example, in a concentration of about 0.3 to 1.5 silica per part binder, for the purpose of facilitating processing composition permeation of the film unit's silver halide crystal and silver precipitating nuclei containing layer or layers. In addition, the silver halide or silver precipitating nuclei containing stratum may be advantageously overcoated with a processing composition permeable polymeric material such as a hardened gelatin pad or the like to advantageously promote uniformity in processing composition permeation of such stratum, by modulating any wave front resultant from initial surface contact with the liquid employed and to thereby promote uniform maintenance of the polymeric binder's physical characteristics.

Although chrome alum and particularly algin have been advantageously employed as hardening agents for the polymeric gelatin emulsion binder, it will be recognized that substantially any hardening or crosslinking agent may be employed, where necessary and with respect to any one or more layers of the film unit, which does not provide deleterious photographic effects, to the extent required to provide a binder lattice which effectively inhibits to a substantial effect, migration of image silver. An extensive collection of hardening agents are disclosed in the art as specifically adapted to effect hardening or crosslinking of photographic polymeric binder material compositions and by reason of their innocuous photographic effects are to be preferred in the practice of the present invention. The sole requirement for effective operation of the film unit is that the emulsion's polymeric lattice be constructed to provide the optical image parameters denoted hereinbefore. Thus, substantially any conventional hardening and crosslinking agent may be selected from those set forth throughout, for example, the pertinent patent literature regarding such agents, and the coneentration employed, as known in the art, will be dependent upon the relative activity of the selected agent, or gaents, and the relative amount of hardening or crosslinking to be effected. The specific concentration of a selective hardening or cross-linking agent to be contacted with a selected polymeric binder, may be readily determined empirically, within the specific context of ultimate photographic employment, by screening. It will be further recognized that any of the various processing composition permeable, synthetic or natural polymeric materials, possessing the physical characteristics required to provide the results denoted above, may be substituted in replacement of the specifically illustrated polymeric materials provided that such selected polymer provides a martix which is not deleterious to photosensitive silver halide crystals and possesses a lattice allowing processing in the manner prevously described.

Suitable silver halide solvents for employment in the practice of the present invention include conventional fixing agents such as the previously noted sodium thiosulfate, sodium thiocyanate, ammonium thiocyanate, the additional agents described in U.S. Pat. No. 2,543,181, and the associations of cyclic imides and nitrogenous bases such as associations of barbiturates or uracils and ammonia or amines and other associations described in U.S. Pat. No. 2,857,274.

Where desired conventional silver toning agent or agents may be disposed within the emulsion composition in a concentration effective to provide a positive image toned in accordance with the desires of the operator.

In the preferred embodiment of the present invention, the processing composition will include an alkaline material, for example, sodium hydroxide, potassium hydroxide or sodium carbonate, or the like, and most preferably in a concentration providing a pH to the processing composition in excess of about 12. The processing composition may, where desired, contain the sole silver halide developing agent or agents employed, or a silver halide developing agent in addition to that disposed within the film unit; however, disposition of one or more developing agents in the emulsion and/or a permeable layer directly associated therewith, intermediate the emulsion and a color screen, is a particularly preferred embodiment, for the purpose of providing enhanced image acuity, by more readily facilitating directly initiated development at radiation exposed areas of the emulsion without the necessity of diffusing such agents to such sites by means of the processing composition selected.

The preferred silver halide developing agents generally comprise organic compounds and, in particular, comprise organic compounds of the aromatic series containing at least two hydroxyl and/or amino groups wherein at least one of such groups is in one of ortho or para positions with respect to at least one another of such groups such as, for example, the various known hydroquinones, p-aminophenols, and their various known functional homologues and analogues.

It will be apparent that the relative proportions of the agents comprising the processing composition set forth herein may be altered to suit the requirements of the operator. Thus, it is within the scope of this invention to modify the herein described processing compositions by the situation of preservatives, alkalis, silver halide solvent, etc., other than those specifically mentioned. When desirable, it is also contemplated to include, in the developing composition, components such as restrainers, accelerators, etc. The concentration of such agents may be varied over a relatively wide range commensurate with the art.

The processing composition solvent employed, however, will generally comprise water and will possess a solvent capacity which does not deleteriously hydrate the selected binder lattices beyond that required to provide the preferred image formation. Accordingly, no adjunct should be included within such composition which deleteriously effects the lattice parameters required for such image formation.

In the description herein, each color series of filter elements has been described as covering that part of the total area in proportion to the total number of colors used, i.e., in the tricolor system, each color occupies one-third of the total area. This may vary quite widely before having a noticeable effect to the observer and, in fact, may be compensated by changing the intensity of the colors. In actual practice, if one dye is of greater intensity than the others, a deliberate compensation may be made by reducing the total relative area of the intense color. The aspect of relative areas is well known in the art so that when relative areas are used in this application, it is intended to include the variances which the art would recognize as being successful.

Various colors and numbers of colors may be used in this invention but the preferred system, as previously mentioned, is a tricolor arrangement of the three primary colors, red, green and blue.

It will be recognized, however, that, in accordance with the instant disclosure, a plurality of chromatic filter element series may be provided, the number of series being solely determined by the optical parameters of the resultant color screen desired.

For example, a four-color system such as red, green, violet-blue and orange-yellow could also be effectively employed in accordance with the teachings of the instant disclosure.

In the practice of the present invention, additive trichromatic color screens possessing 550, 756, and 1125 triplets/inch may be readily employed and it has been found that image resolution obtained by means of the present invention exceeds that obtainable in prior art processes. Such increased resolution specifically facilitates the acuity of color reproduction to be achieved by the practice of the invention and the silver halide stratam will be panchromatically sensitized to provide equal image production, as a direct function of incident exposing radiation, throughout the response portion of the radiation spectrum to further enhance the acuity of color information recordation by the emulsion.

In addition to the described essential layers, it will be recognized that the film unit may also contain one or more subcoats or layers, which, in turn, may contain one or more additives such as plasticizers, intermediate essential layers for the purpose, for example, of enhancing adhesion, and that one or more of the described layers may comprise a composite of two or more strata which may be contiguous or separated from each other.

Where the photosensitive element extends to the lateral edges of the opaque sheets upon superpositioning therebetween, as illustrated, the respective layers of the element specifically including the support may retain antilight piping adjuvants, as detailed above, to prevent edge fogging of the element during processing external the camera and in the presence of radiation actinic to the photo-responsive layer. Alternatively, where desired, the lateral edges of the photosensitive element may terminate preceding termination of the lateral edges of the opaque sheets and the latter may be directly or indirectly adhered to each other, during processing, at their respective opposed lateral surfaces, such construction also facilitating lateral retention of the processing fluid within the confines of the film unit and obviating the employment of fluid retaining means such as the previousy described side guide members, lateral edge differential adhesion between the photosensitive element and contiguous opaque sheet, and the like.

Since certain changes may be made in the above product, process and apparatus without departing from the scope of the invention herein involved, it is intended that all matter contained in the above description shall be interpreted as illustrative and not in a limiting sense.

What is claimed is:

1. In a photographic film unit for the production of an additive multicolor photographic transparency by diffusion transfer processing wherein said film unit is adapted to be processed subsequent to photoexposure by passage intermediate a pair of juxtaposed pressure-applying members, wherein said film unit comprises first and second sheet elements affixed transverse a leading end section, said first sheet carrying on a surface rupturable container means retaining a fluid processing composition, the improvement which comprises said first sheet element carrying on one surface an additive multicolor photosensitive element comprising an additive multicolor screen, photosensitive silver halide, and a diffusion transfer image-receiving layer, said photosensitive silver halide and said image-receiving layer positioned intermediate said first sheet and said additive multicolor screen, said first sheet including an opaque section coextensive the surface of said photosensitive element adjacent thereto, said container located intermediate the leading edge of said first sheet and said photosensitive element and adapted for distributing said fluid processing composition intermediate said photosensitive element and and said first sheet upon application of pressure to said container means, said second sheet adapted to be superposed contiguous the surface of said photosensitive element opposite said first sheet and including an opaque section adapted to be superposed coextensive the surface of said photosensitive element opposite said first sheet upon superpositioning of said second sheet and said photosensitive element.

2. A photographic film unit as defined in claim 1 wherein said photosensitive silver halide is disposed in a layer positioned intermediate said image-receiving layer and said first sheet.

3. A photographic film unit as defined in claim 2 wherein said photosensitive silver halide layer is laminated to said first sheet.

4. A photographic film unit as defined in claim 3 wherein the adhesion exhibited at the interface between said photosensitive silver halide layer and said first sheet is less than the adhesion at the remaining interfaces of said photosensitive element.

5. A photographic film unit as defined in claim 4 wherein the adhesion exhibited at the interface between said fluid processing composition and each of said photosensitive silver halide layer and said first sheet upon distribution therebetween is greater than the adhesion at the remaining interfaces of said photosensitive element.

6. A photographic film unit as defined in claim 5 including a stripping layer positioned intermediate said photosensitive silver halide layer and said image-receiving layer.

7. A photographic film unit as defined in claim 1 including adhesive carried on the surface of said second sheet adapted to maintain said second sheet during processing contiguous the surface of said photosensitive element opposite said first sheet upon superpositioning of said second sheet and said surface of said photosensitive element.

8. A photographic film unit as defined in claim 1 wherein the trailing end section of said rupturable container is spaced from the leading edge section of said photosensitive element on said first sheet and said container is adapted to release said fluid processing composition at said trailing end upon application of compressive pressure to said container, said film unit additionally including a sheet extending transverse and affixed each lateral edge section of said first sheet possessing a leading edge section affixed overlying said trailing end section of said container and a trailing edge section of said sheet affixed underlying said leading edge section of said photosensitive element providing thereby a conduit for transfer of said fluid processing composition from said container to said photosensitive element.

9. A photographic film unit for the production of an additive multicolor photographic transparency by diffusion transfer processing and adapted to be processed subsequent to photoexposure by passage intermediate a pair of juxtaposed pressure-applying members as defined in claim 1, which film unit comprises first and second opaque paper sheet elements affixed transverse a leading end section, said first opaque sheet element carrying on one surface an additive multicolor photosensitive element comprising, in order of essential layers from said first sheet element, a panchromatically sensitized gelatino silver halide layer, a diffusion transfer image-receiving layer comprising silver-precipitating agent dispersed in a binder matrix, a trichromatic additive color screen comprising red-, green- and blue-colored optical filter elements and a transparent support layer, said first sheet element extending at least coextensive the surface of said photosensitive element next adjacent and carrying on said surface carrying said photosensitive element, intermediate the leading edge of said first sheet element and said photosensitive element, a rupturable container retaining a fluid processing composition for distribution intermediate said photosensitive element and said first sheet upon application of compressive pressure to said container and discharge of said container's contents at the trailing edge section of said container, said first sheet including a third paper sheet element extending transverse and affixed each lateral edge section of said first sheet and possessing a leading edge section located overlying said trailing edge section of said container and a trailing edge section located underlying the leading edge section of said photosensitive element providing thereby a conduit for transfer of said fluid processing composition from said container to said photosensitive element upon application of compressive pressure to said container, said second sheet element adapted to be superposed at least coextensive the surface of said photosensitive element opposite said first sheet element, and said first and second sheet elements are adapted to be separated from said photosensitive element subsequent to processing of said film unit to provide said additive multicolor photographic transparency.

10. A photographic film unit as defined in claim 9 wherein said gelatino silver halide layer of said photosensitive element is adapted to be retained with said first sheet element upon separation of said first and second sheet elements from the photosensitive element.

11. A photographic film unit as defined in claim 10 wherein said first sheet element includes a trailing end section extending rearward of the trailing edge of said photosensitive element adapted to be maintained in superposed relationship with the trailing edge section of said second sheet during processing of said film unit to retain, intermediate said opposed trailing edge sections, processing composition extruded at the trailing edge of said photosensitive element.

12. A photographic film unit as defined in claim 11 including a fourth paper sheet element affixed at its trailing end section to a leading end section of one of said first and second sheet elements.

References Cited

UNITED STATES PATENTS

| | | | |
|---|---|---|---|
| 3,433,636 | 3/1969 | Hamilton | 96—76 |
| 3,294,538 | 12/1966 | Downey | 96—76 |
| 2,495,112 | 1/1950 | Wolff | 96—29 |
| 3,298,832 | 1/1967 | Ryan | 96—76 |
| 2,563,342 | 8/1951 | Land | 95—6 |
| 3,455,633 | 7/1969 | Land | 96—3 |

NORMAN G. TORCHIN, Primary Examiner

J. L. GOODROW, Assistant Examiner